May 13, 1958

C. L. ALDRIDGE ET AL 2,834,801

METHOD OF ESTERIFICATION AND PURIFICATION
OF HIGHER ALCOHOLS

Filed Sept. 22, 1954

2 Sheets-Sheet 1

CLYDE L. ALDRIDGE
JOSEPH K. MERTZWEILLER  INVENTORS

BY

*Henry Berk* ATTORNEY

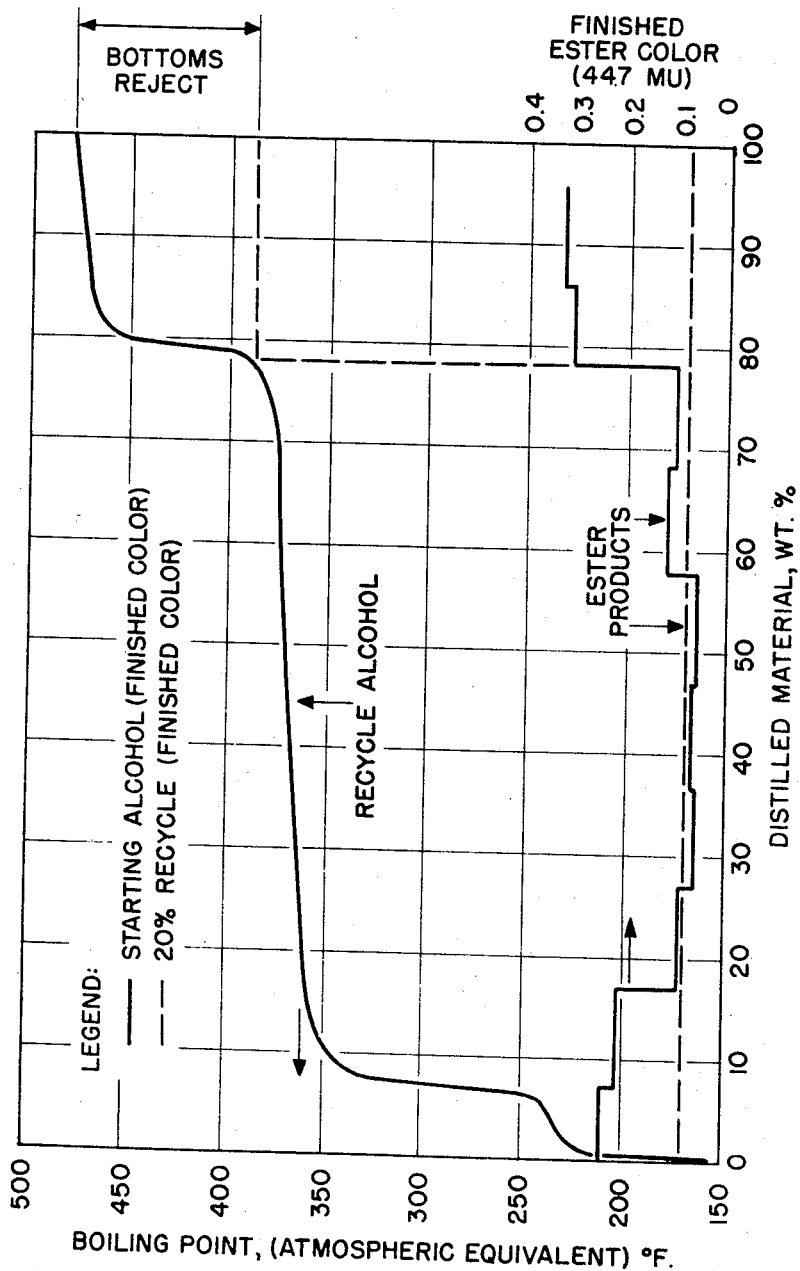

United States Patent Office 2,834,801
Patented May 13, 1958

2,834,801

METHOD OF ESTERIFICATION AND PURIFICATION OF HIGHER ALCOHOLS

Clyde L. Aldridge, Baker, and Joseph K. Mertzweiller, Baton Rouge, La., assignors to Esso Research and Engineering Company, a corporation of Delaware Application September 22, 1954, Serial No. 457,707

5 Claims. (Cl. 260—475)

This invention is concerned with minimizing the formation and presence of undesirable contaminants in the esterification of higher molecular weight alcohols ($C_5$ and higher).

Acid catalyzed esterification of $C_5+$ alcohols, particularly branched or iso type, has been found to engender by-product impurities deleterious to color, volatility, plasticizing action, and other properties of the esters. Some treatments used in the past have helped to eliminate impurities which had their source in the fresh alcohol, but the contaminants which are formed and build up during esterification are of concern herein.

Now it is shown that color-forming contaminants which build up in the esterification especially in the recycled alcohols include components which are above or below the boiling range of the alcohols.

There are indications of color-forming bodies which arise from oxidation, as by an oxidizing acid catalyst, sulfuric acid, or atmospheric oxygen, first with decomposition of the alcohol to olefins, aldehydes and higher ethers. Some protection against formation of these decomposition products is obtained by using catalysts which have low oxidizing actions, e. g. p-toluene sulfonic acid, and by keeping the esterification reactants and products under an inert gas blanket to prevent presence of oxygen.

An important additional step found useful for improving the quality of the ester products involves removal of decomposition products both from the ester and from the unconverted alcohol which is to be recycled.

The esterification may be a continuous, semi-continuous, or batch procedure and involves the recycling of excess alcohol.

Fig. 1 of the drawing illustrates a flow plan of a process for accomplishing objects of the invention.

Fig. 2 shows the relation of contaminants from decomposition of esterified alcohol to color in the finished ester.

Referring to Fig. 1, esterification is carried out in reaction vessel 1, equipped with agitator 2, inlet 3 for the alcohol reactant, 4 for the organic acid or anhydride reactant, and 5 for the catalyst. For heat control and removal of water formed, vapors are drawn from an upper part of reactor 1 by line 6 through a reflux condenser 7, to receiver 8. Water in a separated bottom liquid phase is purged through line 9. The alcohol distillate phase is refluxed by lines 10 and 11 to the reaction zone in reactor 1.

The crude ester product mixed with unreacted excess alcohol is withdrawn from reactor 1 by line 12 to carbonate wash vessel 13 equipped with stirrer 14. Aqueous sodium carbonate solution from line 15 is admixed with the crude acidic ester and alcohol for neutralizing acid.

The neutralized product is passed from vessel 13 by line 16 to settler 17, whence spent aqueous alkaline solution is withdrawn from a bottom liquid layer through line 18.

The neutralized crude ester product mixed with alcohol is passed by line 19 with admixed water from line 20 into the water washing vessel 21 which has stirrer 22.

The water washed material is passed by line 23 into settler 24 for separating the water (lower) layer purged through line 25. The washed alcohol-ester mixture is decanted through line 26 to alcohol stripper tower 27.

Tower 27 is a fractionating means separating unconverted alcohol together with impurities that form low and high boiling ends thereof from the ester. At this point it is important to use sufficiently high temperatures with suitable pressures to remove the injurious decomposition products herein described as the high ethers. Complete removal of the high boiling decomposition products from the esters is an essential part of this invention.

In forming phthalate plasticizers from branched $C_8$ aliphatic alcohols or alkanols with the unreacted alcohol distilled from the ester there will be present about 10 to 25% by wt. organic material (of high ether concentration) shown in Fig. 2 in the material (E) boiling above 390° F. under atmospheric pressure. The low boiling impurities (L) distilled with alcohol will tend to be up to about 10% by wt. of the total distillate taken overhead from tower 27 by line 28.

Alcohol stripping tower 27 has a bottoms reboiler 29 and stripped ester bottoms is withdrawn by line 30. The ester bottoms may be given a finishing treatment by passing through decolorizing char in tower 31 whence the finished ester is recovered by line 32. The ester may also be further purified by distillation, if desirable.

The alcohol and impurities from stripper 27 are passed by line 28 into the fractionating column 33 to provide suitable separating means for segregating the alcohol from the low-boiling (olefinic) impurities which are distilled and rejected through overhead line 34. Bottoms (ether impurities) are heated by reboiler 35 and rejected through line 36. The purified alcohol is withdrawn as an intermediate fraction through line 37 for recycling to reactor 1.

The invention is demonstrated by operations shown in the following examples:

EXAMPLE 1

To esterify a feed of $C_8$ Oxo alcohols prepared by reaction of $C_7$ olefins with carbon monoxide and hydrogen in the presence of a cobalt catalyst, 4650 g. of the alcohols were reacted with 2150 g. of phthalic anhydride in the presence of 250 cc. of 3 wt. percent aqueous $H_2SO_4$ catalyst. The reaction mixture was boiled under reflux at about 350° F. for 1½ hours until water evolution essentially ceased. Total heating period was 3 hours.

Yields:
538 g. water
6,533 g. organic material

The organic material was subjected to stripping and fractionation to separate the unreacted alcohol (23.1% mole excess) and olefin with various amounts of higher ether cut impurities from the ester to determine effects of residual impurities in the ester and the alcohol recycled. Another objective was to determine satisfactory conditions for removing such impurities and preventing their buildup.

There are several kinds of evaluation involved in segregating the deleterious impurities:

(1) Determination of impurities which have to be removed from the esters to eliminate adverse quality effects. This includes finding which impurities cause the adverse effects, and temperatures to which esters can be safely heated to distill off the impurities.

(2) Determination of which impurities have to be removed from the alcohol which is recycled to the ester reaction zone and how to accomplish the removal.

EXAMPLE 2

The sulfuric acid-catalyzed crude ester product formed as described in Example 1 was subjected to treatments for removal of the impurities which are present at the low- and high-boiling ends of the alcohol. The color formation caused in subsequent esterification by recycling various fractions of the excess alcohol stripped from the ester are summarized in Fig. 2. In these tests the ester products formed were treated with char and the finished ester color was determined. The graphical data shows that it is especially important to eliminate from the ester and the recycled alcohol the high boiling ends to obtain improved (lower) color of the order of 0.1.

In accomplishing safe elimination of the high boiling alcohol (ether) ends—the crude ester product can be stripped as in tower 27 having 1 to 5 plates under subatmospheric pressures as low as 5 mm. mercury absolute. Under such reduced pressures with iso-octyl alcohol the important cut point is of the order of 260° F. which is equivalent to 480° F. under atmospheric pressure. Accordingly, the ester should be stripped of all materials which boil under atmospheric pressure at temperatures below 480° F., and the recycle iso-octyl alcohol then has to be separated from bottoms material which boils in the range of 390° F. to 480° F. at atmospheric pressure to eliminate the unstable ether type components. The boiling characteristics of the alcohol and bottoms reject material from which the alcohol has to be separated are shown in Fig. 2.

That there are deleterious effects from substances boiling in the range of 390° to 480° F. in di-iso-octyl phthalate ester plasticizers made from the Oxo alcohols has been shown by excessive volatility losses and low plasticizing efficiency when these substances remain in the ester. Typical results on the effect of the ether fraction (390°–480° F.) on the volatility and plasticizing properties are tabulated.

Table

[Plasticizer: Di-iso-octyl phthalate ester.]

|  | Ester Freed of 390° to 480° F. Cut | Ester Containing 3.6 wt. percent of 390° to 480° F. Cut |
|---|---|---|
| Volatility—7 days at 100° C., Percent Plasticizer Lost | 14.3 | 16.0 |
| Dynamic modulus ×10⁴: | | |
| +25° C | 1.41 | 1.62 |
| +10 | 4.5 | 4.9 |
| −5 | 12.8 | 13.6 |
| −20 | 22.4 | 24.3 |

The findings of the effects of the materials boiling in the range of 390° to 480° F. on the ester plasticizer obtained from iso-octyl alcohol are summarized into the following points:

(1) The impurities, principally ethers which tend to be formed during the esterification and boil in the range of 390° to 480° F. at 1 atm. cause more color buildup than light impurities hitherto most suspected of making the ester color bad.

(2) Removal of the 390° to 480° F. boiling range substances from the recycle iso-octyl alcohol is very desirable.

(3) The 390° to 480° F. boiling range substances are undesirable in giving volatility losses of plasticizer.

(4) The 390°–480° F. boiling range substances are even more undesirable in the plasticizer ester in that they decrease the plasticizing efficiency by 10–20% as shown by dynamic moduli values in the table.

(5) The alcohols having two alpha hydrogen atoms and particularly the branched alcohols derived from the Oxo process, are more liable to form the undesirable ether contaminants than are alcohols having alkyl substitution on the alpha carbon atom.

The removal of the materials boiling in the 390°–480° F. boiling range from the esters and the recycle alcohol is of course specific for iso-octyl alcohol. The deleterious material is specifically the saturated di-alkyl ethers which tend to have about twice the number of carbon atoms as the alcohols used in esterification. These ethers will exhibit their characteristic boiling ranges but will lie between the final boiling point of the alcohol and the initial boiling point of the ester. The principal scope of this invention is the removal of these contaminants from both the ester and the recycle alcohol. Distillation is a convenient means of accomplishing this, although other methods such as extraction, adsorption, azeotropic or extractive distillation may be applied, also.

It is to be understood that the esters may be formed from other organic acids, such as adipic, sebacic, and azelaic acids, and that the ether-type containing impurities formed can be separated from the esters and from the alcohols used in making such esters. In making such esters, an excess of the alcohols is to be employed above that needed for reaction with each of the carboxy group of the organic acids.

The invention described is claimed as follows:

1. In a process of preparing a plasticizer ester from a branched $C_5$ to $C_{10}$ alcohol, the improvement which comprises removing by distillation from said ester under subatmospheric pressure excess unreacted alcohol and contaminants which are principally ethers which have a lower boiling range than the desired ester and higher boiling than the alcohol, and recovering said ester as an undistilled bottoms stripped of the excess unreacted alcohol and of said contaminants which are principally ethers.

2. In a process of preparing a plasticizer ester from a branched $C_5$ to $C_{10}$ alcohol, a portion of the alcohol reacted with a dibasic organic acid to form said ester being recycled alcohol used in excess of said acid, the improvement which comprises removing by distillation from said ester unreacted excess alcohol and substances including principally ethers which boil below the desired ester in a subatmospheric pressure stripping zone wherein the ester becomes a stripped bottoms product, then removing the thus obtained alcohol from said substances which boil below the desired ester and esterifying with an additional amount of the dibasic organic acid the thus obtained excess alcohol freed of said contaminating substances.

3. In a process defined by claim 2, said alcohol being a $C_5$ to $C_{10}$ Oxo alcohol and said acid being phthalic anhydride.

4. In a process of preparing a plasticizer ester from Oxo iso-octyl alcohol reaction with a dibasic organic acid, the improvement which comprises stripping under subatmospheric pressure as low as 5 mm. mercury absolute from the crude ester product after it has been neutralized and washed an excess of this alcohol which remains unreacted with olefinic decomposition products lower boiling than the alcohol and higher boiling ether-containing decomposition products that boil in the range of 390° to 480° F. at one atmosphere, then separating said alcohol from said lower and higher boiling decomposition products, and using the thus separated excess alcohol for esterifying additional amounts of the dibasic organic acid.

5. In a process of preparing an acid catalyzed plasticizer ester product of $C_8$ Oxo alcohols reacted with phthalic anhydride and treating the resulting products to eliminate deleterious impurities, the improvement which comprises passing the crude ester product containing an excess of the alcohols, unreacted olefinic decomposition products lower-boiling than the alcohols, and higher-boiling ether-containing decomposition products higher boiling than the alcohol into a stripping zone after the ester product has been neutralized and water washed, stripping from the ester product under subatmospheric pressures down to as low as 5 mm. mercury absolute the excess alcohol with said olefinic impurities and said ether-containing impurities which distill from the ester product at temperatures up to 260° F. under the subatmospheric pressures, withdrawing the stripped ester product as a bottoms product from said stripping zone, passing the alcohol distilled with said lower and higher boiling decomposition products from said stripping zone to a fractionating zone, distilling in said fractionation zone the olefins and the alcohols to separate the alcohols as an intermediate fraction, rejecting the ether-containing decomposition products which boil in the range of 390° to 480° F. under atmospheric pressure as bottoms in said fractionation zone, and recycling the thus separated alcohols in the intermediate fraction to the esterification zone for reaction with additional amounts of phthalic anhydride.

References Cited in the file of this patent

UNITED STATES PATENTS

| | | |
|---|---|---|
| 1,989,699 | Kyrides | Feb. 5, 1935 |
| 2,614,128 | Mertzweiller | Oct. 14, 1952 |
| 2,748,159 | Finelli | May 29, 1956 |
| 2,752,386 | Ackroyd et al. | June 26, 1956 |
| 2,755,262 | Dilke et al. | July 17, 1956 |
| 2,760,972 | Joy | Aug. 28, 1956 |